Patented Apr. 22, 1924.

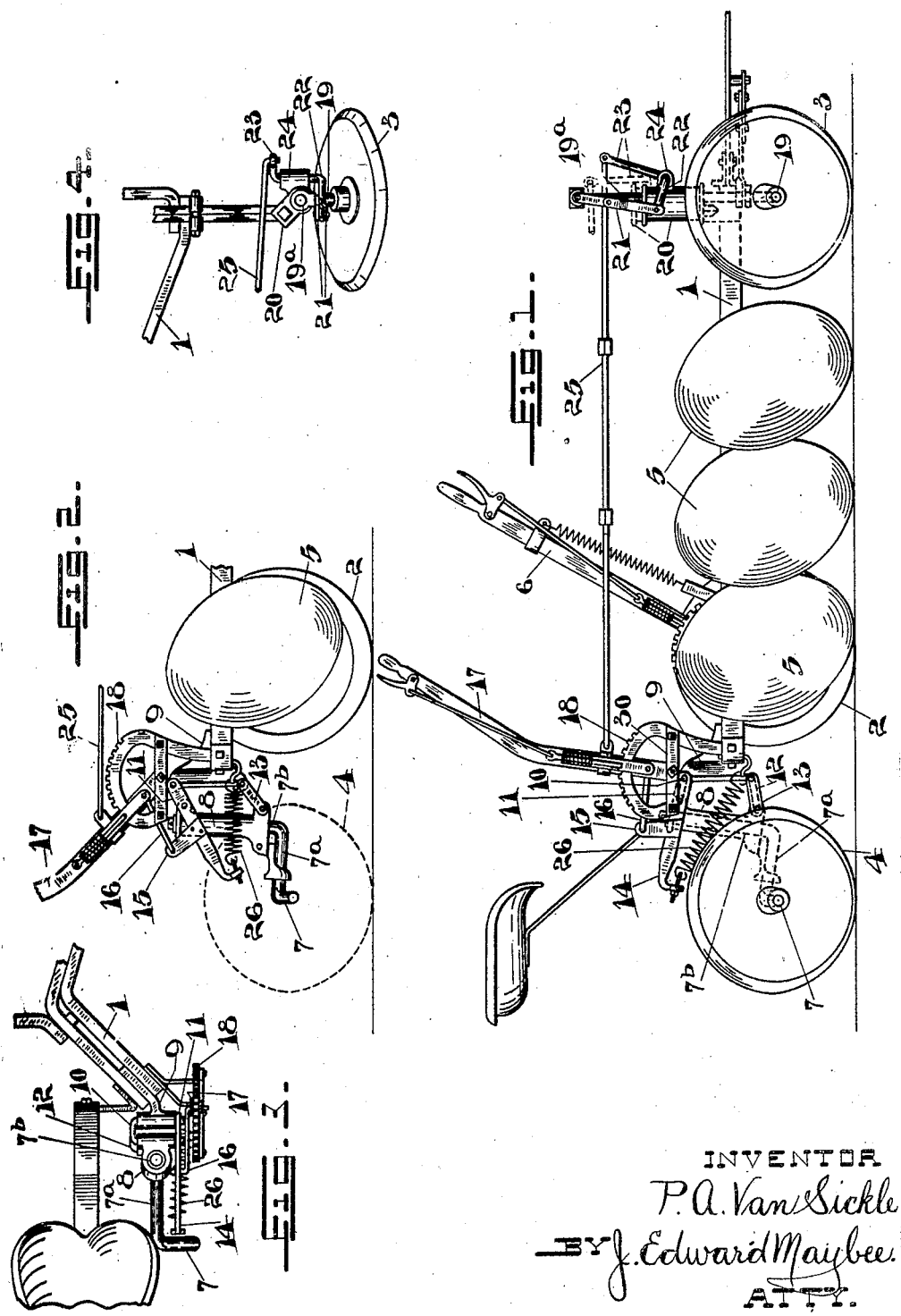

1,491,119

UNITED STATES PATENT OFFICE.

PAUL ABRAHAM VAN SICKLE, OF BRANTFORD, ONTARIO, CANADA, ASSIGNOR TO MASSEY-HARRIS CO. LIMITED, OF BRANTFORD, ONTARIO, CANADA.

WHEEL PLOW.

Application filed August 2, 1922. Serial No. 579,101.

*To all whom it may concern:*

Be it known that I, PAUL A. VAN SICKLE, of Brantford, in the county of Brant, Province of Ontario, Canada, a subject of the King of Great Britain, have invented certain new and useful Improvements in Wheel Plows, of which the following is a specification.

This invention relates to wheel plows having discs adapted to be raised and lowered relative to the ground and my object is to provide means to assist the operator to raise the discs. A further object is to devise improved means for carrying and vertically adjusting the rear furrow wheel relative to the frame, and for simultaneously adjusting the rear and front furrow wheels relative to the frame.

I attain my objects by means of the constructions hereinafter described and illustrated in the accompanying drawings in which—

Fig. 1 is a side elevation of my plow showing the discs in an intermediate position;

Fig. 2 is a similar view of part of the plow showing the discs in a raised position;

Fig. 3 a plan view of the rear part of Fig. 1; and

Fig. 4 a plan view of the forward part of Fig. 1.

In the drawings like numerals of reference indicate corresponding parts in the different figures.

1 is the frame of the plow which is provided with the land wheel 2 and the front and rear furrow wheels 3 and 4 respectively. The discs 5 are rotatably mounted on the frame in any suitable manner. To set the discs to plow any desired depth of furrow, I provide the lever 6 adapted to regulate the land wheel 2 in the usual manner.

The discs are adapted to be raised and lowered relative to the ground to bring them into an inoperative or an operative position respectively. This is accomplished by raising or lowering both the front and the rear end of the frame relative to the furrow wheels to lift the discs clear of the ground for transportation or turning the plow around at the end of the furrows and to lower the discs into the ground. The rear furrow wheel 4 is journalled on a transverse axle 7 which is formed at the rear end of an arm 7ª which is provided with an upwardly extending journal 7ᵇ journalled on a supporting member 8 which is swingably connected with the rear end of the frame 1 as hereinafter described. The wheel 4 is provided with a V shaped tire and the axle 7 is bent downwardly so that the side of this tire will run along the bottom of the furrow. At the rear end of the frame 1 is secured a bracket 9 having a pair of spaced holes substantially one above the other. In the upper hole is pivotally mounted one leg of a U bolt 10, the other leg of which is pivotally connected with the upper end of the supporting member 8. A link 11, having holes formed therein adapted to receive the free ends of the U bolt legs, is held in position thereon by cotter pins or any other suitable means. In the lower hole of the bracket 9 is journalled one leg of a U bolt 12, the other leg of which is pivotally connected with the lower end of the supporting member 8. A link 13, adapted to be received on the free ends of the legs of this U bolt, is held in position thereon by means of cotter pins. Preferably the bracket 9 and the supporting member 8 are each formed with a pair of spaced lugs having holes formed therein through which the U bolts pass and the links 11 and 13 prevent the free ends of the bolts from spreading apart (see Fig. 3). The U bolts 10 and 12 thus form the connections between the rear end of the frame 1 and the supporting member 8 and which is carried by the rear furrow wheel and it is evident that by controlling the swinging movement of one of the U bolts that the vertical movement of the rear end of the frame will be controlled.

On the link 11 is formed or secured a rearwardly extending part 14 provided with an upwardly directed extension 15 in which is pivotally connected one end of a connecting rod 16, the other end of which is pivotally connected with a lever 17. This lever is fulcrumed on a bracket 30 carried by the frame 1 and a quadrant 18 formed with a notched periphery is adapted to releasably hold the lever in any desired position. From the above description it will be seen that the link 11 with its rearwardly extending part 14 forms in effect a lever of which the leg of the U bolt 10, which passes through the lug on the supporting member 8, forms the fulcrum.

The front end of the frame 1 is adapted to be raised and lowered on the upwardly extending part 19ª of the front furrow axle 19. The forward furrow wheel 3 is also provided with a V shaped tire and the axle 19 is bent downwardly so that the side of this tire will run along the bottom of the furrow. A bearing 20 suitably carried on the forward end of the frame 1 is slidably mounted on the part 19ª in the following manner. A link 21 has one end pivotally connected at the upper end of the part 19ª, the other end of the link being pivotally connected with one end of a crank arm 22 the journal of which is journalled in the bearing 20. An arm 23 is formed on or secured to the end of the crank arm journal that is remote from the end carrying the crank arm 22.

Referring to Figs. 1 and 4, it will be noted that the bearing 20 is provided with a lug 24 in which the crank arm 22 is journalled and that the arms 22 and 23 form in effect a bell crank whereby a movement of the arm 23 in one direction will cause the bearing 20 to be slid upwardly on the part 19ª thus lifting the forward end of the frame and a movement of the arm 23 in the opposite direction will permit the forward end of the frame to drop by means of gravity.

To simultaneously operate the front and rear ends of the frame to raise or lower the discs 5, I connect the arm 23 by means of the connecting rod 25 with the lever 17. With this arrangement it is evident that a movement of the lever 17 in a forward direction (see Figs. 1 and 2), will swing, by means of the connecting rod 16, the rear end 14 of the link 1 upwardly on its pivotal connection with the supporting member 8 and thus lower the rear end of the frame and that this forward movement of the lever 17 will rock the arm 23 to operate the crank arm 22 to lower the forward end of the frame simultaneously with the rear end and thus put the discs 5 into the ground. Referring to Fig. 2 it will be noted that a movement of the lever 17 in a rearward direction will swing the rear end 14 of the link 11 downwardly on its pivotal connection with the supporting member 8 and thus raise the rear end of the frame and that this movement of the lever will pull the connecting rod 25 to rock the arm 23 thus lifting the bearing 20, as hereinbefore described, and raising the forward end of the frame 1 simultaneously with the rear end of the frame to lift the discs 5 out of the ground.

With this construction it is obvious that the operator lifts the weight of the frame when operating the lever 17 to raise the discs out of the ground and that the weight of the frame will assist the operator to put the discs into the ground. To reduce the amount of energy required to raise the frame I provide a tension spring 26 having one end connected with the rear end of the rearwardly extending end 14 of the link 11, the other end being connected with the rear end of the frame 1. Referring particularly to Figs. 1 and 2 it will be seen that as the frame 1 is lowered the spring 26 is tensioned and tends to operate the end 14 of the link 11 to raise the frame 1.

To further assist the operator in raising the frame I form the legs of the lower U bolt 12 slightly farther apart that the legs of the upper U bolt 10 so that as the frame is being raised the rear furrow wheel 4 will travel slightly forward relative to the frame. This movement causes the supporting member 8 to be rocked to a substantially vertical position so that the pivot leg of the U bolt 10 is raised at the same time as the end 14 of the link 11 is lowered thus assisting the lifting operation.

What I claim as my invention is:—

1. In a wheel plow the combination of a frame provided with a rear axle having an upwardly extending part; a furrow wheel journalled on the axle; a supporting member carried by the upwardly extending part of the rear furrow wheel axle; a link having its forward end pivotally connected with the rear end of the frame and fulcrumed intermediate its ends on the supporting member; a second link pivotally connected with the frame and the supporting member, the links being spaced apart and substantially one above the other; a hand lever fulcrumed at the rear end of the frame; and a connecting rod pivotally connected with the lever and the rear end of the first mentioned link whereby a movement of the lever will actuate the link to raise and lower the rear end of the frame.

2. In a wheel plow the combination of a frame provided with a rear axle having an upwardly extending part; a furrow wheel journalled on the axle; connections between the forward furrow wheel and the front end of the frame whereby the latter may be raised and lowered relative to the wheel; a supporting member carried by the upwardly extending part of the rear furrow wheel axle; a link having its forward end pivotally connected with the rear end of the frame and fulcrumed intermediate its ends on the supporting member; a second link pivotally connected with the frame and the supporting member, the links being spaced apart and substantially one above the other; a hand lever fulcrumed at the rear end of the frame; a connecting rod pivotally connected with the lever and the rear end of the first mentioned link whereby a movement of the lever will actuate the link to raise and lower the rear end of the frame; and a tension spring having one end connected with the rear end of the first mentioned link, the other end of the spring being connected with the rear end of the frame.

3. In a wheel plow, the combination of a frame provided with a forward furrow wheel; a rear axle having an upwardly extending part; a furrow wheel journalled on the axle; a supporting member carried by the upwardly extending part of the rear furrow wheel axle and formed with a pair of spaced lugs one above the other; a bracket secured at the rear end of the frame and having a pair of spaced lugs one above the other; a U bolt having its legs pivotally connected with the lugs on the upper ends of the supporting member and the bracket; a U bolt having its legs pivotally connected with the lugs on the lower ends of the supporting member and the bracket; a rearwardly extending link having holes formed therein adapted to receive the free ends of the legs of the first mentioned U bolt; a hand lever fulcrumed at the rear end of the frame; a connecting rod pivotally connected with the lever and the rear end of the link; and a tension spring having one end connected with the rear end of the link, the other end of the spring being connected with the rear end of the frame.

4. A wheel plow constructed as set forth in claim 3 in which the legs of the U bolt, connecting the lower ends of the supporting member and the bracket, are formed slightly farther apart than the legs of the U bolt connecting the upper ends of the supporting member and the bracket, and in which the rear axle is formed at the rear end of a crank having an upwardly extending part journalled in the supporting member.

Signed at Brantford this 13th day of July 1922.

PAUL ABRAHAM VAN SICKLE.

Witnesses:
   WM. J. VERITY,
   JOHN G. HOSSACK.